United States Patent

[11] 3,611,372

| | | |
|---|---|---|
| [72] | Inventor | William Fishbein<br>New Shrewsbury, N.J. |
| [21] | Appl. No. | 217,243 |
| [22] | Filed | Aug. 8, 1962 |
| [45] | Patented | Oct. 5, 1971 |
| [73] | Assignee | The United States of America as represented by the Secretary of the Army |

[54] COMBINED PULSE AND CONTINUOUS WAVE RADAR
5 Claims, 3 Drawing Figs.

[52] U.S. Cl. ................................................... 343/7.7,
343/9
[51] Int. Cl. ...................................................... G01s 9/42
[50] Field of Search ........................................... 343/7.7, 8,
9, 17.2

[56] References Cited
UNITED STATES PATENTS

| 3,079,599 | 2/1963 | Caspers | 343/7.7 UX |
| 3,386,095 | 5/1968 | Stevens | 343/7.7 X |
| 3,562,750 | 2/1971 | Fishbein et al. | 343/7.7 |

Primary Examiner—T. H. Tubbesing
Attorneys—Harry M. Saragovitz and Julian C. Keppler CLAIM: 1. A doppler radar system comprising, a transmitter comprising a continuously operating microwave oscillator, means to modulate the frequency of said transmitter simultaneously by means of a sine wave oscillator and a pulse generator, the pulse generator frequency being different than and nonharmonically related to the sine wave frequency, the amplitude and duration of each modulating pulse being sufficient to advance or retard the phase of the transmitter by 360°, the sine wave modulating frequency being chosen so that the round trip transit time of a target at the maximum desired range equals one-half cycle of said sine wave modulating frequency, means to radiate the output of said transmitter to a target area and receive target echo signals therefrom, means to apply a sample of said transmitter output and said target echo signals to a mixer circuit, a high pass filter connected to the output of said mixer circuit, said high pass filter being designed to pass the sine wave modulation frequency and the pulse modulation frequency and to attenuate lower frequencies, means to separate said sine wave modulation frequency and said pulse modulation frequency into a continuous wave channel and a pulse channel, respectively, means in each of said channels to extract doppler frequency signals from the target signals therein, means to apply said doppler frequency signals alternately to a headset, and means to correlate the doppler frequency signals in each of said channels.

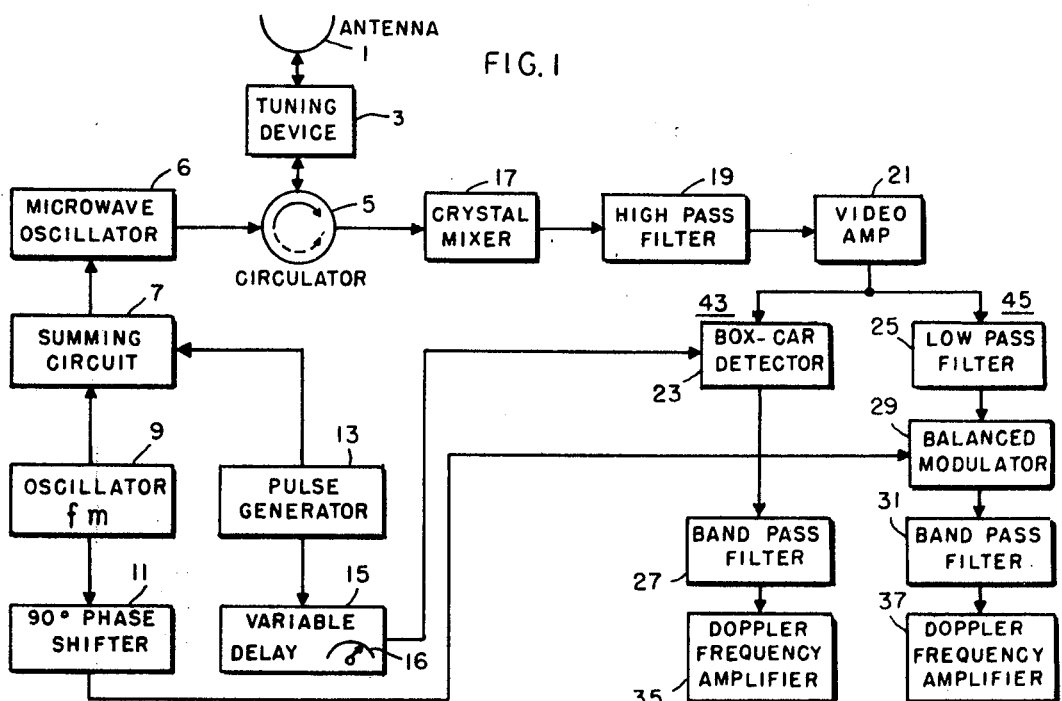
FIG. 1
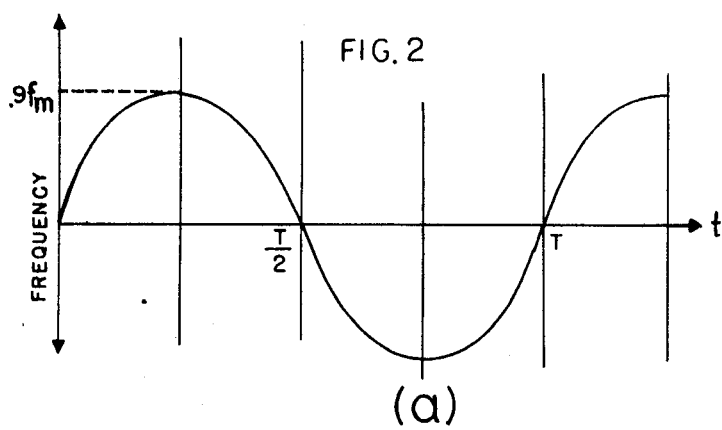
FIG. 2
(a)
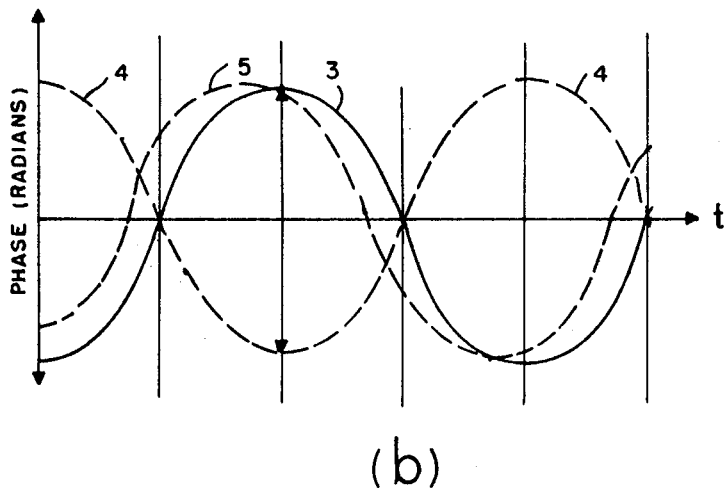
(b)
INVENTOR,
WILLIAM FISHBEIN
BY Harry M. Saragovitz
ATTORNEY.

COMBINED PULSE AND CONTINUOUS WAVE RADAR

The invention described herein may be manufactured and used by or for the Government for governmental purposes without the payment of any royalty thereon.

The present invention relates to radar and more particularly to a novel and useful doppler radar set adapted for combat surveillance applications.

Briefly stated, the present invention is a radar set which includes the advantageous features of both pulse-type radar and CW (continuous wave) radar. The set resolves targets in range, measures target range, indicates whether a target is incoming or outgoing and allows the operator to observe moving targets at all ranges while determining the range of any single target.

It is therefore an object of the invention to provide an improved radar set.

Other objects and advantages will become apparent from the following detailed description and drawings, in which:

FIG. 1 is a block diagram of the invention and

FIG. 2a and b are waveforms useful in explaining the operation of the invention.

Referring now to FIG. 1, the CW microwave oscillator 6 comprises the transmitter of the set and may be any suitable oscillator, such as a klystron, which is capable of being frequency modulated. The microwave oscillator is simultaneously frequency modulated by sine wave oscillator 9 and pulse generator 13. The two modulation signals are combined in summing circuit 7 and applied to microwave oscillator 6. The modulating sine wave from 9 is chosen so that the maximum phase deviation of 6 is no more than ±25°. This value of deviation prevents excessive amplitude modulation of the pulse echoes by the sine wave modulation. The pulse amplitude and pulse length of 13 are chosen so that the phase of microwave oscillator 6 is advanced or retarded by one cycle (360°) by each pulse. The pulse frequency and the sine wave frequency are made different and nonharmonically related. The frequencies are so chosen that there is no coincidence in their harmonics up to at least the fifth harmonic. The effects of the two modulation signals may then be easily separated in the receiver. For example, the sine wave and pulse frequencies may be made 40 and 50 kc. respectively. As a practical matter it has been found convenient to derive both of these signals from different harmonics of the same crystal-controlled 10 kc. oscillator. This eliminates spurious doppler signals caused by drift between the two modulation signals. The output of the microwave oscillator is fed to a conventional transmitting and receiving antenna 1 via a three port circulator 5 and tuning device 3. Echoes from targets within the beam of antenna 1 are fed to crystal mixer 17 by the action of the circulator, the solid line arrow of which indicates the direction of easy energy flow. A small portion of output of the microwave oscillator leaks through the circulator in the direction of the broken arrow and is applied to the crystal mixer to provide a local oscillator signal for demodulating the echo signal. The crystal mixer is a nonlinear device such as a diode which is capable of demodulating the echo signal. The crystal mixer in effect measures the instantaneous phase difference between the echo and the microwave oscillator. The sine wave modulation frequency, FM, is chosen so that the round trip transit time of a target at the maximum desired range equals one-half a period of the modulation frequency. With this choice of modulating frequency the output of 17 resulting from distant targets is enhanced relative to that from close-in targets and therefore close-in clutter doppler signals from leaves or other foliage will have less tendency to mask the weaker return of more distant targets. This feature of the invention can be understood by reference to FIG. 2. The sine wave shown in FIG. 2a represents the frequency variation of the microwave oscillator 6 due to the sine wave oscillator 9. Since the corresponding phase variation is the time integral of the frequency variation, the phase of the transmitted signal can be represented by a negative cosine wave 3, FIG. 2b. Due to the relationship between maximum range and modulation frequency mentioned above, the modulation frequency phase variation of an echo from a target at maximum range will be exactly out of phase with the phase variation of the transmitted signal. Such an echo signal is represented by the broken curve 4 in FIG. 2a, it can be seen that the phase difference between waves 3 and 4 will pulsate at the sine wave modulation frequency and will have an amplitude equal to the combined amplitudes of the transmitted and echo signals, due to the out-of-phase relationship therebetween. The curve 5 in FIG. 2b represents the phase variation of an echo from a close-in target. It can be seen that the phase difference between this echo signal and the transmitted wave is much smaller and therefore will produce a smaller amplitude signal from crystal detector 17, for an equal strength echo. Since the close-in targets normally produce much stronger echoes than those near the maximum range, and the output of the crystal mixer is determined conjointly by the phase difference and the echo strength, the choice of modulation frequency tends to equalize the sensitivity of the set to targets at all ranges.

Considering again FIG. 1, the crystal mixer output will contain the sine wave modulation frequency, FM and harmonics thereof, modulated by doppler frequency signals from moving targets, a train of pulses at the repetition rate of 13 also modulated by doppler frequencies, and low frequency unmodulated doppler frequencies. The latter signal is filtered out by high pass filter 19 and the remaining signals are applied to and amplified by video amplifier 21. Filter 19 may have a cutoff frequency of approximately 40 kc. with the choice of modulation frequencies mentioned above. The composite signal composed of the CW component and the pulse component are then separately processed to obtain the doppler intelligence on each. In the pulse channel 43 the pulse component of the signal is applied to range-gated boxcar detector 23. The gating signal for this detector is the output of variable delay means 15, the delay of which can be manually adjusted by means of knob 16. The input to variable delay means 15 is the same pulse which modulates the microwave oscillator. If the delay of 15 is adjusted to equal the round trip transit time to a moving target, the output of the boxcar detector will contain the doppler signals representing such moving target. These signals, which are in the audio range, are amplified by doppler frequency amplifier 35 after being filtered by band-pass filter 27. In the continuous wave channel 45, the low pass filter 25, which may have a cutoff frequency of 45 kc., blocks most of the pulse components of the composite signal, and passes the sine wave component at frequency FM to one input of balanced modulator 29, the other input of which is obtained from oscillator 9 after being passed through 90° phase shifter 11. The output of balanced modulator 29 represents doppler signals anywhere within the beam of the radar set. Any moving target within the beam will cause slight variations in the frequency and phase of the CW signal in channel 45 and the balanced modulator 29 compares the target echo to the original modulating signal to detect the variations therein which are indicative of moving targets. The output of balanced modulator 29 is filtered in band-pass filter 31 and amplified by doppler frequency amplifier 37. The band-pass filters 27 and 31 are designed to eliminate doppler signals caused by slowly moving foliage and other ground clutter, as well as the beat or difference frequency between the two modulation frequencies. For an X-band radar intended to detect moving personnel and land vehicles, the filters 27 and 31 may have a passband from 50 to 1,000 c.p.s. The headset 33 is alternately connectable to the pulse or CW channels by means of double throw switch 34. In operation, the operator monitors moving targets at all ranges with the headset connected to the CW channel. When a moving target is picked up therein, the operator adjusts the variable delay means 15 by means of knob 16 and compares the signals in both channels by means of switch 34 until the same moving target appears in both. The target range can then be determined by noting the position of knob 16 relative to its associated scale.

The remainder of the circuitry comprises means to correlate the pulse and CW doppler signals and thereby indicate whether the target is moving outward or inward relative to the radar beam. The CW channel is passed through a broadband 90° phase shifter 39 and then applied to balanced modulator 40 as a reference. The pulse channel doppler signal is applied to the other input of the balanced modulator. When a moving target is in the range gate, the pulse channel doppler signal will correlate with the doppler signal from the CW channel and produce a DC output from the modulator 40. Further, the sense or polarity of this DC output indicates whether the moving target is outbound or inbound. The balanced modulator output is applied to zero center DC meter 41. The sense of deflection of this meter indicates the direction of movement of the target. The correlation of the pulse and CW doppler signals results in higher overall signal-to-noise ratio since the noise, being of random frequency and amplitude, does not correlate. The CW channel has an inherently higher signal-to-noise ratio than the pulse channel, and as long as the signal-to-noise ratio in the CW channel is appreciably greater than unity, a good doppler reference will be available for the pulse channel and efficient use can be made of the integrating function of the DC meter. Correlation involves multiplication and integration of the signals to be correlated. The balanced modulator 40 in effect multiplies the two doppler signals and the meter 41 integrates the resulting product. A gain in sensitivity as well as signal-to-noise ratio is realized with this system, since the noise bandwidth is determined by the time constant of the meter instead of the human ear. With this feature of the set, the operator would leave the headset permanently connected to the CW channel to detect moving targets at any range. When a target is encountered he would adjust knob 16 until the deflection of meter 41 indicated that the moving target was within the range gate.

The invention should not be limited by the numerical examples given above as these are purely illustrative. Further, it should be noted that the modulation produced by pulse generator 13 may be any type of pulse modulation, including any of the pulse compression techniques well known to the art. Also, while the CW portion of the set has been shown as a modulated type, it is obvious that the CW portion need not be modulated, however a modulated CW, as shown and described, is the most practical.

While a specific embodiment of the invention has been shown and described, many modifications of the system are possible without departing from the basic concepts taught herein. Accordingly, the invention should be limited only by the scope of the appended claims.

What is claimed is:

1. A doppler radar system comprising, a transmitter comprising a continuously operating microwave oscillator, means to modulate the frequency of said transmitter simultaneously by means of a sine wave oscillator and a pulse generator, the pulse generator frequency being different than and nonharmonically related to the sine wave frequency, the amplitude and duration of each modulating pulse being sufficient to advance or retard the phase of the transmitter by 360°, the sine wave modulating frequency being chosen so that the round trip transit time of a target at the maximum desired range equals one half cycle of said sine wave modulating frequency, means to radiate the output of said transmitter to a target area and receive target echo signals therefrom, means to apply a sample of said transmitter output and said target echo signals to a mixer circuit, a high pass filter connected to the output of said mixer circuit, said high pass filter being designed to pass the sine wave modulation frequency and the pulse modulation frequency and to attenuate lower frequencies, means to separate said sine wave modulation frequency and said pulse modulation frequency into a continuous wave channel and a pulse channel, respectively, means in each of said channels to extract doppler frequency signals from the target signals therein, means to apply said doppler frequency signals alternately to a headset, and means to correlate the doppler frequency signals in each of said channels.

2. A doppler radar system comprising, a transmitter comprising a continuously operating microwave oscillator, means to modulate the frequency of said transmitter simultaneously by means of a sine wave oscillator and a pulse generator, the pulse generator frequency being different from and nonharmonically related to the sine wave frequency, the amplitude and duration of each modulating pulse being sufficient to advance or retard the phase of the transmitter by 360°, the sine wave modulating frequency being chosen so that the round trip transit time of a target at the maximum desired range equals one half cycle of said modulating frequency, means to radiate the output of said transmitter to a target area and receive target echo signals therefrom, means to apply a sample of said transmitter output and said target echo signals to a mixer circuit, a high pass filter connected to the output of said mixer circuit, said high pass filter being designed to pass the sine wave modulation frequency and the pulse modulation frequency and to attenuate lower frequencies, means to separate said sine wave modulation frequency and said pulse modulation frequency into a continuous wave channel and a pulse channel, respectively; a range-gated boxcar detector in said pulse channel for extracting the doppler signals from target echoes therein and for measuring the range of moving targets, said range gate comprising a delayed sample of said pulse generator output, means to extract the doppler signals indicative of moving targets at all ranges from the target echoes in the continuous wave channel, means to alternately connect a headset to each of said channels, means to correlate the doppler signals in said channels, said last-named means including a balanced modulator to which said doppler signals are applied and a zero-center meter connected to the output of said balanced modulator.

3. A combined-pulse and continuous-wave radar set comprising, means to generate continuous wave microwave energy, means to periodically pulse modulate the phase of said microwave energy by one cycle, means to simultaneously phase modulate said microwave energy by means of a sine wave generator, said modulation frequencies being different and nonharmonically related, means to radiate said modulated microwave energy to a target area and to receive target echoes therefrom, means to separate the target echoes into pulse and continuous wave channels, means in each channel to extract doppler signals indicative of moving targets, means in said pulse channel to measure the range of said moving targets, and means to correlate the doppler signals in said channels to indicate whether said moving target is inbound or outbound.

4. A combined pulse and continuous wave radar set comprising, a microwave oscillator which is simultaneously modulated by a pulse generator and sine wave generator, said generators having different and nonharmonically related frequencies, means to radiate the output of said microwave oscillator to a target area and receive target echoes therefrom, means to demodulate said target echoes, means to separate said target echoes into a pulse channel and a continuous wave channel, said pulse channel comprising; a range-gated boxcar detector, the range gate of which is a a variably delayed sample of the output of said pulse generator, a band-pass filter connected to the output of said boxcar detector adapted to pass doppler signals indicative of a moving target within the range gate, and a doppler frequency amplifier; said continuous wave channel comprising; a filter to pass said sine wave frequency and attenuate said pulse frequency, means to compare the target echo therein to a sample of the output of the sine wave oscillator to detect doppler signals indicative of moving targets at all ranges, and means to amplify said doppler signals, means to alternately connect a headset to said pulse and continuous wave channels, and means to correlate the doppler signals in each of said channels, said last-named means comprising a balanced modulator fed by both channels, and means connected to said balanced modulator for indicating the polarity of the DC output thereof.

5. A combined pulse and continuous wave radar comprising, a microwave oscillator, a pulse generator, a sine wave generator, means to add the outputs of said generators and modulate the frequency of said microwave oscillator with the resultant sum signal, means to radiate the output of said microwave oscillator to a target area and receive target echoes therefrom, means to apply said target echoes and a portion of said microwave oscillator output to a mixer circuit, a high pass filter connected to the output of said mixer circuit, a video amplifier connected to the output of said high pass filter, means to separate said target echoes into a pulse channel and a continuous wave channel, said pulse channel comprising; a boxcar detector connected to the output of said video amplifier, a variable delay means connected between said pulse generator and said boxcar detector, a band-pass filter connected to the output of said boxcar detector, a doppler frequency amplifier connected to the output of said band-pass filter; said continuous wave channel comprising; a low pass filter connected to the output of said video amplifier, a first balanced modulator connected to the output of said low pass filter, a 90° phase shifter connected between said sine wave generator and said first balanced modulator, a band-pass filter connected to the output of said first balanced modulator, a doppler frequency amplifier connected to the output of said band-pass filter, a 90° phase shifter connected to the output of said doppler frequency amplifier; a second balanced modulator with its inputs connected to said 90° phase shifter and said doppler frequency amplifier in said pulse channel, a zero-center meter connected to the output of said second balanced modulator, and a headset alternately connectable between the outputs of said two doppler frequency amplifiers.